US006602096B1

(12) United States Patent
Kronestedt et al.

(10) Patent No.: US 6,602,096 B1
(45) Date of Patent: Aug. 5, 2003

(54) CARD-RECEIVING DEVICE FOR A COMMUNICATION APPARATUS

(75) Inventors: Victor Kronestedt, Hägersten (SE); Håkan Ohlgren, Haninge (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/584,100

(22) Filed: May 31, 2000

(30) Foreign Application Priority Data

Jun. 14, 1999 (SE) .............................................. 9902279

(51) Int. Cl.[7] .............................................. H01R 24/00
(52) U.S. Cl. ........................................ 439/630; 439/188
(58) Field of Search ................................. 439/155, 630, 439/188, 489, 928.1, 946, 946.2; 235/492, 448, 441; 324/761; 361/684; 200/51.12, 51.09

(56) References Cited

U.S. PATENT DOCUMENTS

| 5,231,274 A | * | 7/1993 | Reynier et al. .............. 235/441 |
| 5,330,363 A | * | 7/1994 | Gardner et al. ........... 200/51.09 |
| 5,655,917 A | * | 8/1997 | Kaneshige et al. .......... 439/155 |
| 6,000,767 A | * | 12/1999 | Liu et al. .................. 312/223.2 |
| 6,062,889 A | * | 5/2000 | Hyland et al. ............. 200/51.12 |
| 6,130,387 A | * | 10/2000 | Bricaud et al. ........... 200/43.04 |
| 6,261,113 B1 | * | 7/2001 | Chen .......................... 439/260 |
| 6,375,482 B1 | * | 4/2002 | Fan ............................ 439/188 |
| 6,375,483 B1 | * | 4/2002 | Chang ........................ 439/188 |

FOREIGN PATENT DOCUMENTS

| DE | 19850646 A1 | | 5/2000 | |
| EP | 0 669 590 A2 | | 8/1995 | |
| EP | 0 743 717 A2 | | 11/1996 | |
| EP | 0 930 577 A1 | | 7/1999 | |
| FR | 2 783 622 A1 | | 3/2000 | |
| GB | 2326050 A | * | 9/1998 | ........... H04B/1/034 |
| GB | 2 326 050 A | | 12/1998 | |
| WO | 98/33138 A1 | | 7/1998 | |

OTHER PUBLICATIONS

The American Heritage Dictionary of the English Language, Third Edition copyright 1992 by Houghton Mifflin Company. Electronic version licensed from INSO Corporation.*
Merriam–Webster's Collegiate Dictionary, Tenth Edition, Copyright 1999, Merriam–Webster, Incorporated.*

* cited by examiner

Primary Examiner—Tho D. Ta
Assistant Examiner—James R. Harvey
(74) Attorney, Agent, or Firm—Nixon & Vanderhye P.C.

(57) ABSTRACT

A card-receiving device for a communication apparatus, such as a handheld device or a personal computer card, receives a circuit card, such as a SIM-card. The device includes a body member having a card-receiving portion, a guide that allows movement of the body member to be performed in relation to a printed circuit board of the communication apparatus, and a switch for controlling an electric circuit interfacing and/or powering the circuit card. The switch includes a first contacting mechanism adapted to directly contact a second contacting mechanism of the printed circuit board for enabling the electric circuit.

22 Claims, 7 Drawing Sheets

CARD-RECEIVING DEVICE FOR A COMMUNICATION APPARATUS

FIELD OF THE INVENTION

Figure 1:
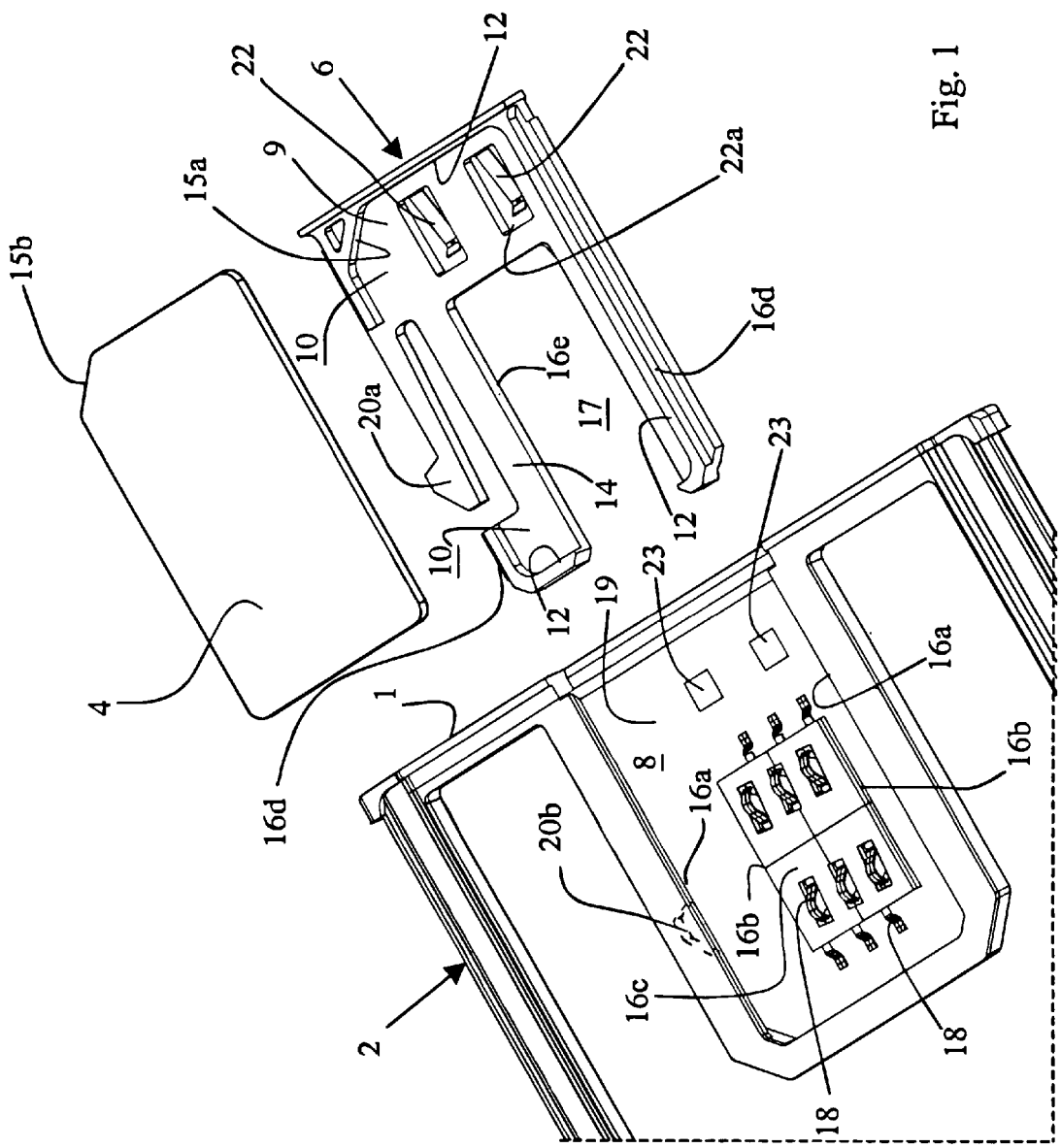

The present invention relates to a card-receiving device for a communication apparatus, such as a handheld device or a personal computer card, and for receiving a circuit card, such as a SIM-card, including a body member having a card-receiving portion and a guide means allowing movement of the body member to be performed in relation to a printed circuit board of said communication apparatus, and a switch means for controlling an electric circuit interfacing and/or powering said circuit card.

It also relates to a communication apparatus, such as a handheld device or a PC-card, including a printed circuit board and a housing defining a space for receiving or including such a card-receiving device.

Such a card-receiving device and such a communication apparatus is known from U.S. Pat. No. 5,655,917. The therein described card-receiving device suffers from the drawback that it is space consuming, as the locking mechanism, the switch means and the a card-receiving means portion of the body member are separate parts, placed adjacent to one another on a member intermediate the printed circuit board and the body member. It is also provided with a complicated locking mechanism requiring several movable parts, which may cause malfunction.

Another card-receiving device is described in GB-A-2 326 050, in which the switch means and the a card-receiving means portion of the body member are separate parts, placed adjacent to one another on a member intermediate the printed circuit board and the body member, while the locking mechanism is arranged such that the thickness of the body member is increased. Furthermore, the switch means has a reverse switch function, i.e. the electric circuit is broken, when the card is inserted by depression of a spring member. If the spring member is bent or broken, this will indicate anyway that the card is inserted, causing the circuit card to be damaged, as the electric circuit is closed.

It should be noted that there are card-removal devices without electric switch means. Such a card-receiving device of e.g. a mobile telephone is generally always mounted behind the battery thereof, as a safeguard against damage of the circuit card, as the battery must be removed, before access is given to the card.

It is therefore the object of the invention to provide a card-receiving device—including switch means—which has improved space properties.

SUMMARY OF THE INVENTION

This object has been achieved by a card-receiving device as defined initially, which is characterised in that said switch means includes a first contacting means adapted to directly contact a second contacting means of said printed circuit board for enabling said electric circuit.

It has also been achieved by a communication apparatus as defined initially, which is characterised in that said printed circuit board is provided with said second contacting means.

Hereby is achieved a card-receiving device, which protects the card from being destroyed and is yet less space-consuming.

Preferably, said first contacting means includes a pair of resilient contacting members arranged on said body member, said resilient contacting members being adapted to directly contact a pair of contact surfaces of said second contacting means. Of course, the first contacting means may instead include a pair of contact surfaces and the said second contacting means may instead include a pair of resilient contacting members arranged to directly contact arranged the contact surfaces of the first contacting means. Hereby, the use of an intermediate body member is avoided, resulting in a less space-consuming card-receiving device.

Preferably, the contact surfaces of said second contacting means are surfaces on said printed circuit board. Hereby, a simple design of the resilient contacting members is achieved and service thereof is hence easier to facilitate.

Suitably, the body member is provided with a support surface and a wall forming means, together defining said card-receiving portion and adapted to guide the circuit card to be received such that a side of the circuit card comprising contact surfaces is turned towards said support surface. Hereby is achieved a controlled guiding of the circuit card while inserting it.

Advantageously, said body member defines an opening for allowing contacting surfaces of the circuit card to be left uncovered when placed on said support surface. Hereby, connection to the contacting surfaces of the circuit card is allowed, while being turned towards the body member, which in turn avoids the need for an intermediate body member.

Preferably, said body member includes a latching member for allowing the card-receiving device to be releasably secured to the communication apparatus, said locking member constituting a part of said support surface. Hereby, the use of a separate locking member is avoided, resulting in a less space-consuming card-receiving device.

Suitably, said body member is substantially planar, said guide means including first guide members adapted to allow a movement substantially parallel to a plane defined by the body member. In particular, said first guide members are adapted to allow a substantially linear movement. Of course, the first guide members may instead allow a movement about an axis perpendicular to the said plane. Hereby is achieved that the body member is slid into the communication apparatus.

According to the invention, the printed circuit board of said communication apparatus is provided with said second contacting means. In particular, the second contacting means of said communication apparatus includes a pair of conductive surfaces arranged directly on the printed circuit board. Hereby, the use of an intermediate body member for the second contacting means is avoided, resulting in a less space-consuming card-receiving device.

Advantageously, said printed circuit board is provided with a protruding member provided with third contacting means adapted to contact contacting surfaces of said circuit card, said protruding member constituting part of said guide means. By integrating the third contacting means with the guide means, a less space-consuming card-receiving device is achieved.

DRAWING SUMMARY

Figure 2:
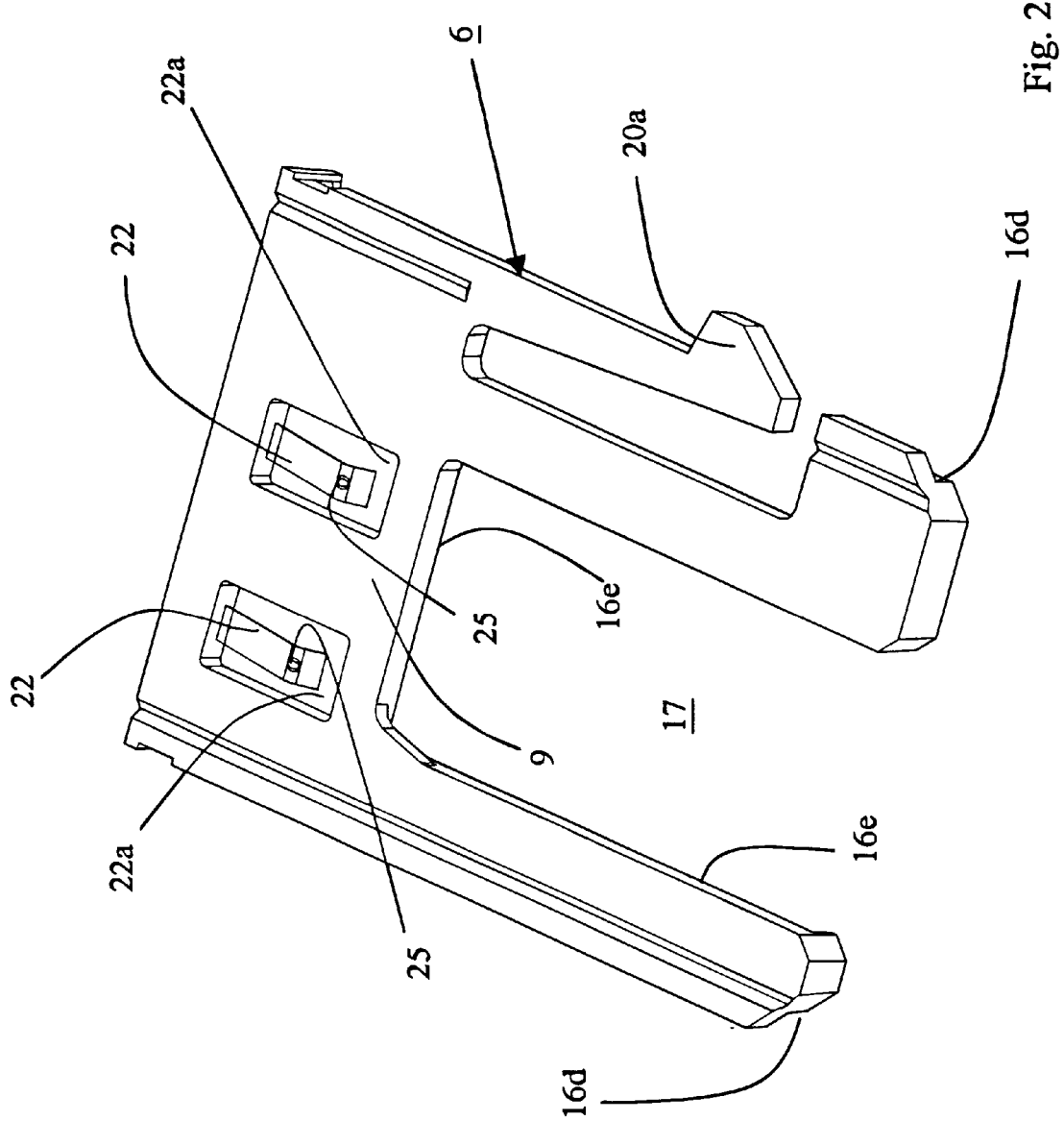
Figure 3:
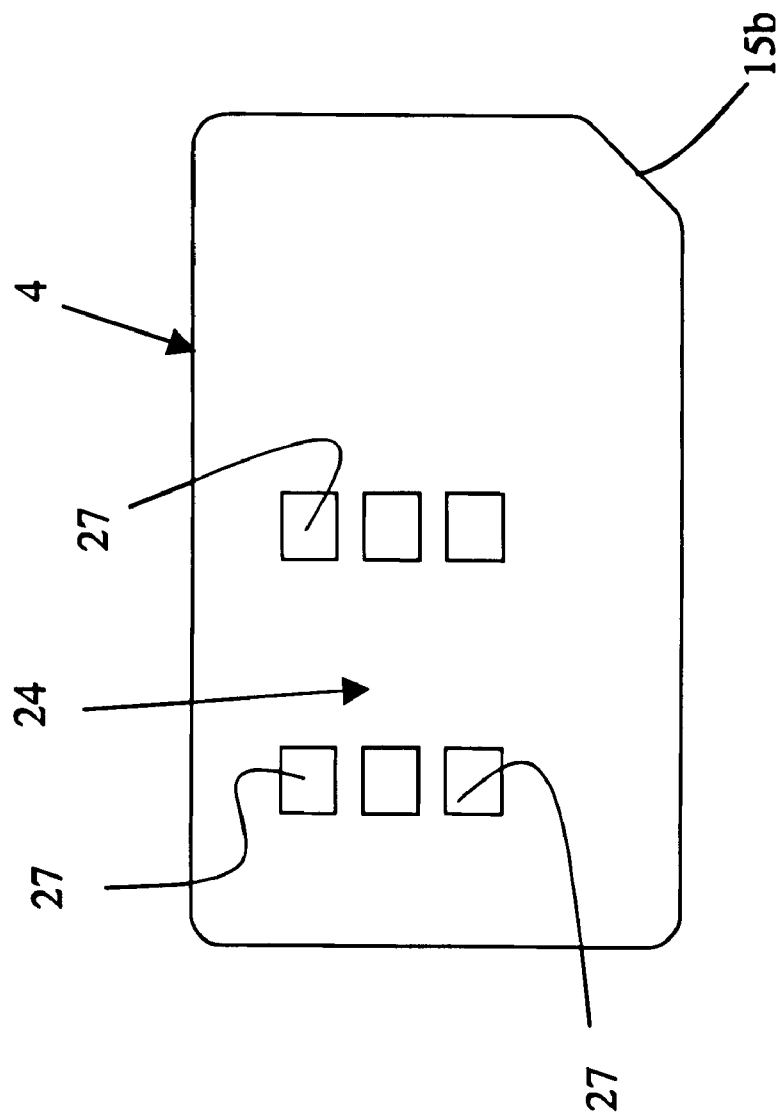
Figure 4:
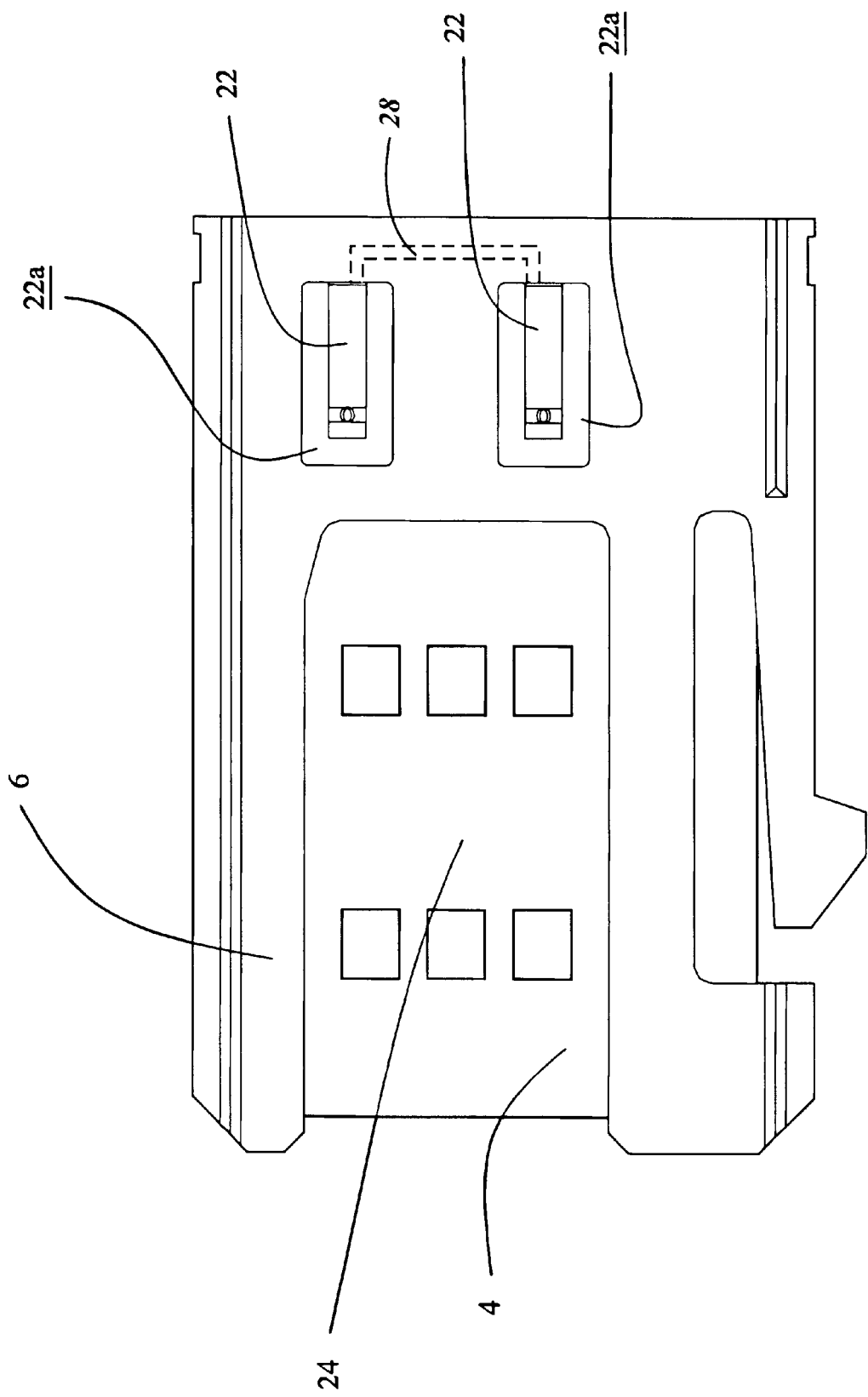
Figure 5:
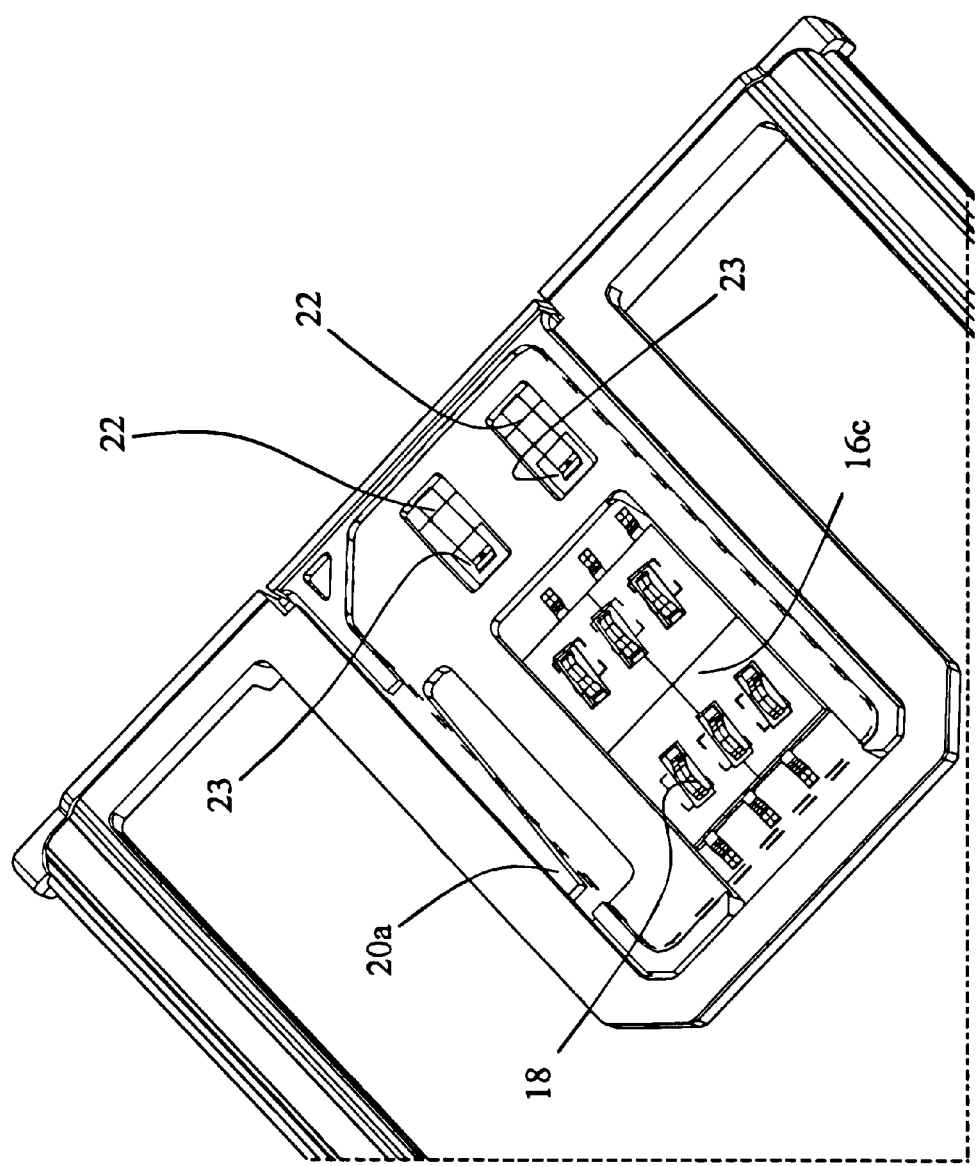
Figure 6:
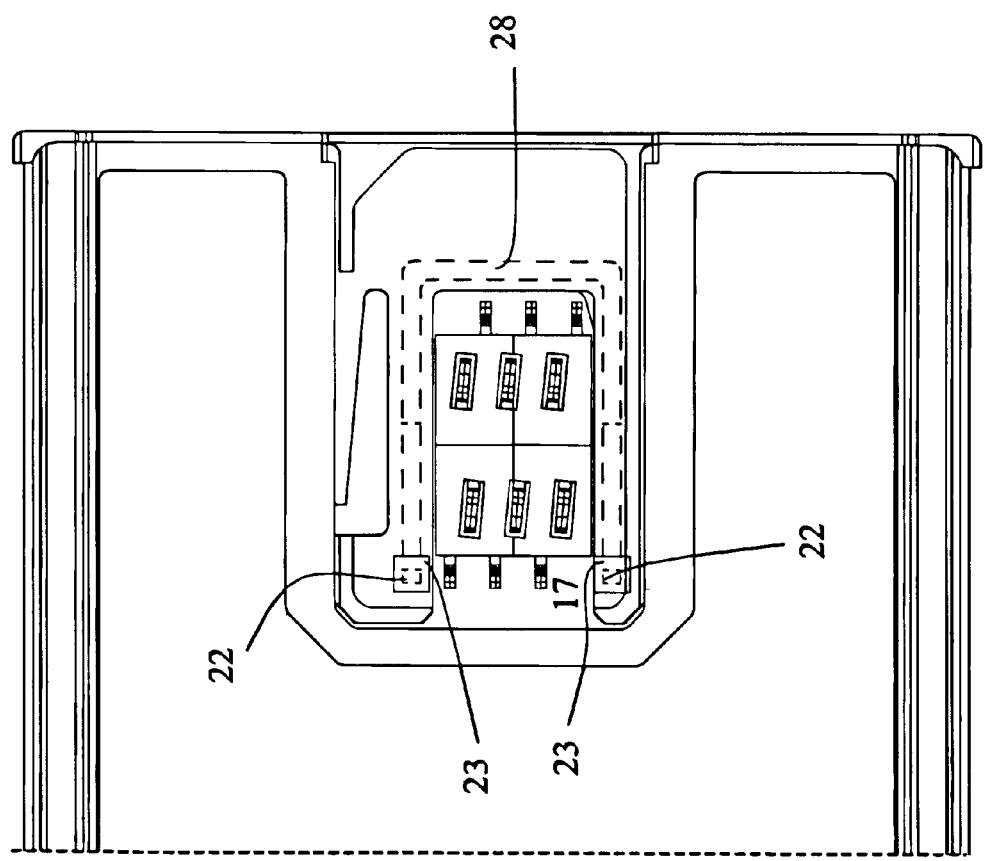

In the following, the invention will be described in more detail by reference to the accompanying drawings, in which FIG. 1 illustrates a part of a communication apparatus and a card-receiving device provided with a switch means, FIG. 2 is a perspective view of the opposite side of the card-receiving device shown in FIG. 1, FIG. 3 illustrates a circuit card provided with an electronic circuit, FIG. 4 illustrates the card-receiving device with included circuit card, FIG. 5 is a perspective view of the communication apparatus of FIG. 1 with inserted card-receiving device and circuit card, the latter in broken lines, FIG. 6 is a top view of a the communication apparatus of FIG. 1 with inserted card-receiving device and circuit card provided with switch means according to a first alternative embodiment.

Figure 7:
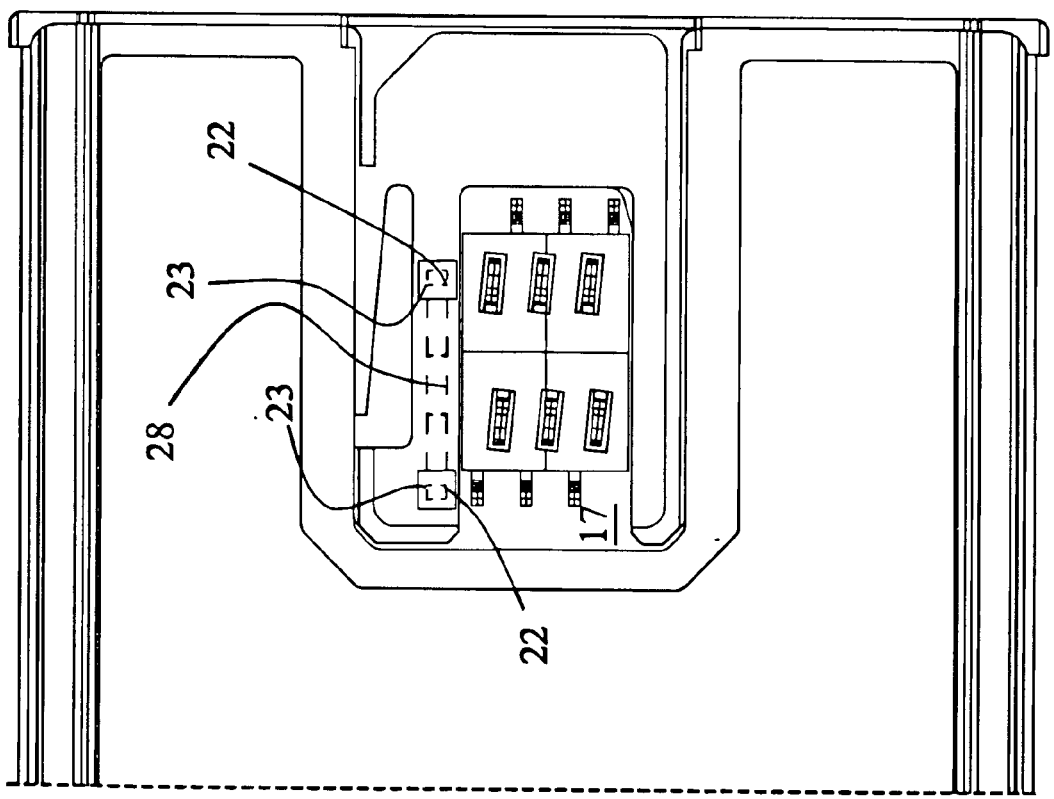

FIG. 7 is a top view of a the communication apparatus of FIG. 1 with inserted card-receiving device and circuit card provided with switch means according to an second alternative embodiment.

DETAILED DESCRIPTION

FIG. 1 shows a part of a housing 1 for a communication apparatus 2, such a handheld device or a card for a personal computer, also called PCMCIA-card. It may alternatively be adapted for a multimedia card or a so called smart card, e.g. a cash card. In order to identify the used communication apparatus, when communicating via e.g. a GSM-net, a circuit card 4, such as a "subscriber's identification module", also called SIM-card, is provided. In the figure, parts of the housing 1 have been omitted for reasons of clarity.

In order to allow insertion of die circuit card 4 into the communication apparatus 2, a card-receiving device 6 is provided, and which is insertible into a space 8 in the form of a slot.

The card-receiving device 6 has a body member 9 provided with a card-receiving portion 10 defined by wall means 12 and a support surface 14. The wall means 12 defines a guide portion 15a. The card receiving portion 10 is intended to receive the circuit card 4, which is provided with a cut-off portion 15b, corresponding to the guide portion 15a, such that the circuit card is guided into a single possible position.

Guide means is provided in the communication apparatus 2 in the form of elongated tracks 16a and side walls 16b of a protruding central member 16c. The card-receiving device 6 is provided with corresponding guide means in the form of a elongated protruding guide members 16d and internal walls 16e forming an opening 17. The guiding members 16a and 16d co-operate for a rough guiding of the card-receiving device 6 when being initially inserted into the space 8, while the guiding members 16b and 16e co-operate for a final fine guiding during said insertion.

The protruding central member 16c is mounted via six spring contacts 18 on a printed circuit board (PCB) 19 for electronics and other components (not shown) necessary for creating communication. Such components are well known in the art and will not be described in further detail.

A locking means is provided in the form of a locking or latching member 20a on the card-receiving device 6 and a corresponding groove 20b in the communication apparatus 2. The latching member 20a further constitutes a further guide member, which fits into the elongated track 16a.

The latching member 20a is made as a cut-out part of the body portion 9 at the support surface 14.

A switch means in the form of a pair of interconnected spring contacts 22 arranged in openings 22a is provided for connection to the contact surfaces 23 on the PCB for controlling the interface between a circuit 24 on the circuit card 4 (see FIG. 3) and the electronics and components (not shown) on the printed circuit board 19.

FIG. 2 shows the opposite side of the card-receiving device 6 shown in FIG. 1, according to the invention. The spring contacts 22 are provided with protruding contact points 25, intended to bear against the PCB contact pads 23.

FIG. 3 shows the opposite side of the circuit card 4 shown in FIG. 1. For the purpose of identifying the communication apparatus, the circuit card 4 is provided with said electronic circuit 24 carrying application specific functions and/or information. The circuit card 4 has dimensions according to international standard specifications (so called ETSI) regarding the GSM network; it is according to present specifications rectangular and is provided with said cut-off guide portion 15b. Of course, future circuit cards 4 may be specified to have a different form. The circuit 24 has six contact surfaces (pads) 27, having standardised dimension and being arranged at a standardised location of the card 4.

FIG. 4 shows the card-receiving device 6 having a circuit card 4 placed in the card-receiving portion 10 and seen from below.

FIG. 5 shows the card-receiving device 6 and the circuit-card 4 inserted in the space 8. The circuit card has been shown with broken lines for reasons of clarity.

As can be seen, the electrical switch spring-contacts 22 lie against the PCB pads 23, creating contact 28 therebetween. The six contacts 18 of the protruding central member 16c correspond to the six contact areas 27 of the circuit card 4.

FIG. 6 shows a first alternative embodiment of the switch means, in which the pair of interconnected spring contacts 22 and the PCB pads 23 are arranged on opposite sides of the opening 17. The interconnection of the spring contacts 22 are indicated by broken lines and indicated by 28.

FIG. 7 shows a second alternative embodiment of the switch means, in which the pair of interconnected spring contacts 22 and the PCB pads 23 are arranged on the same side of the opening 17 as the latching member 20a.

Of course, the interconnected spring contacts 22 and the PCB pads 23 could be arranged on the side of the opening 17 opposite to the latching member 20a.

OPERATION

In order to insert the circuit card 4 (cf. FIG. 1), it is placed in the card-receiving portion 10, the circuit 24 facing towards the opening 17. The card-receiving device 6 is inserted into the space 8 until the latching member 20a moves into the groove 20b. Each spring contact 18 contacts each of the six contact areas 27, and the spring contacts 22 contacts the pads 23. The resulting connection between the spring contacts 22 and PCB pads 23 can be used to generate an electrical control signal that indicates whether the circuit card has been inserted or not.

When removing the circuit card, the card-receiving device 6 is pulled out from the space 8. Hereby, normal pulling force overcomes the spring force of the latching member 20a. The spring contacts 22 will be disconnected from the PCB pads 23 and the generated control signal is used to disable the signals and powering between the PCB circuitry and the circuit card and thus protecting the equipment from being destroyed.

What is claimed is:

1. A card-receiving device for a communications apparatus, such as a handheld device or a personal computer card, and for receiving a circuit card, such as a SIM-card, including a body member displaceable relative to a printed circuit board of the communications apparatus and having a card-receiving portion and a guide means allowing substantially longitudinal movement of the body member to be performed in relation to the printed circuit board of said communication apparatus, and a switch for controlling an electric circuit interfacing and/or powering said circuit card including a pair of resilient contact members arranged on the body member for directly physically contacting a pair of contact surfaces formed as a part of a surface of said printed circuit board, wherein said electric circuit is enabled when there is direct contact between the pair of resilient contact members and the pair of printed circuit board contact surfaces.

2. A card-receiving device according to claim 1, wherein the body member is provided with a support surface and a wall forming means, together defining said card-receiving portion and adapted to guide the circuit card to be received such that a side of the circuit card comprising contact surfaces is turned towards said support surface.

3. A card-receiving device according to claim 2, wherein said body member has portions defining an opening for allowing contacting surfaces of the circuit card to be left uncovered when placed on said support surface, said portions constituting a pair of said guide means.

4. A card-receiving device according to claim 1, wherein said body member includes a latching member for allowing the card-receiving device to be releasably secured to the communication apparatus, said latching member constituting a part of said support surface.

5. A card-receiving device according to claim 1, wherein said body member is substantially planar, said guide means including first guide members adapted to allow a movement substantially parallel to a plane defined by the body member.

6. A card-receiving device according to claim 5, wherein said first guide members are adapted to allow a substantially linear movement.

7. A card-receiving device according to claim 1, wherein said switch means is an electric on/off switch means.

8. A communication apparatus, such as a handheld device or a PC-card, including a printed circuit board and a housing defining a space for receiving a card-receiving device according to claim 1 characterized in that said printed circuit board is provided with said pair of printed circuit board contact surfaces.

9. A communication apparatus, such as a handheld device or a PC-card, including a housing, a printed circuit board and a card-receiving device according to claim 1, said housing defining a space for receiving said card-receiving device characterized in that said printed circuit board is provided with said pair of printed circuit board contact surfaces.

10. A communication apparatus according to claim 8, wherein said pair of printed circuit board contact surfaces includes a pair of conductive surfaces arranged directly on the printed circuit board.

11. A communication apparatus according to claim 8, wherein said printed circuit board has a protruding member adapted to contact contacting surfaces of said circuit card, said protruding member constituting part of said guide means.

12. A card-receiving device for a communications apparatus, comprising:

a body member displaceable relative to a printed circuit board of the communications apparatus and having a card-receiving portion for receiving a circuit card and a guide for allowing movement of the body member in relation to the printed circuit board of the communication apparatus, and a switch mechanism providing an electrical interface between the printed circuit a board and a received circuit card and including a pair of resilient contact members arranged on the body member to directly physically contact a pair of contact surfaces formed as a part of a surface of the printed circuit board to permit transmission of electrical signals between the printed circuit board and the received circuit card, wherein an electric circuit for the transmission of electrical signals between the printed circuit board and the received circuit card is enabled when there is direct contact between the pair of resilient contact members and the pair of printed circuit board contact surfaces.

13. A card-receiving device according to claim 12, wherein the body member is provided with a support surface and a wall together defining the card-receiving portion and adapted to guide a received circuit card such that a side of the received circuit card is turned towards the support surface.

14. A card-receiving device according to claim 13, wherein the body member includes guiding portions that define an opening for leaving contacting surfaces of the circuit card uncovered when placed on the support surface.

15. A card-receiving device according to claim 13, wherein the body member includes a latching member for allowing the card-receiving device to be releasably secured to the communication apparatus, the latching member being a part of the support surface.

16. A card-receiving device according to claim 14, wherein the body member is substantially planar and the guiding portions include first guide members adapted to allow movement substantially parallel to a plane defined by the body member.

17. A card-receiving device according to claim 16, wherein the first guide members are adapted to allow a substantially linear movement.

18. A card-receiving device according to claim 8, wherein the switch mechanism is an electric switch.

19. A communication apparatus including a printed circuit board and a housing defining a space for receiving a card-receiving device according to claim 8.

20. A communication apparatus according to claim 19, wherein the printed circuit board includes a protruding member provided with plural contacts adapted to contact a surface of the circuit card.

21. A communication apparatus including a housing, a printed circuit board, and a card-receiving device according to claim 8, the housing defining a space for receiving the card-receiving device wherein the printed circuit board is provided with the pair of contacting surfaces.

22. A communication apparatus according to claim 21, wherein the printed circuit board includes a protruding member provided with plural contacts adapted to contact a surface of the circuit card.

* * * * *